Patented Mar. 29, 1927.

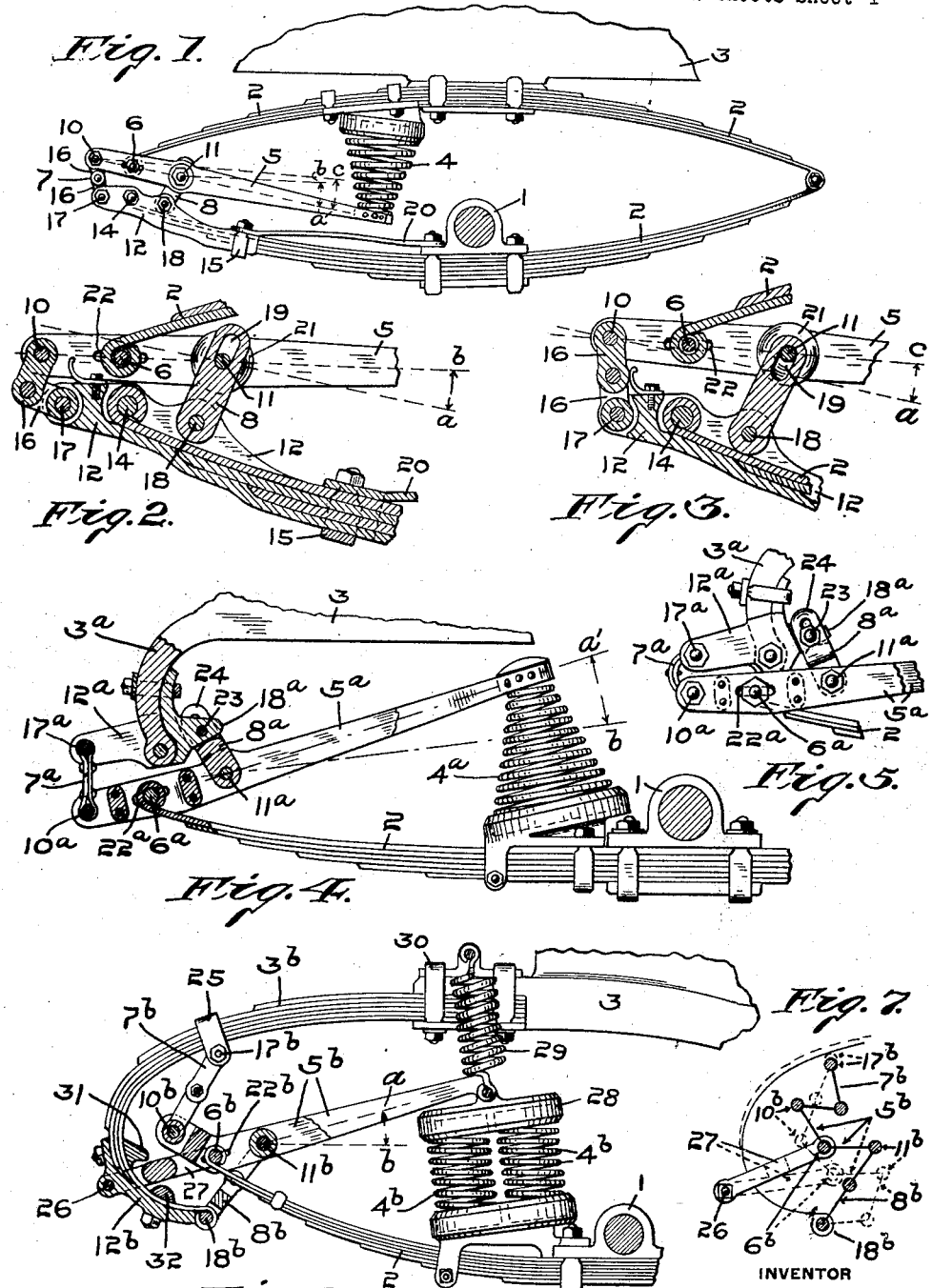

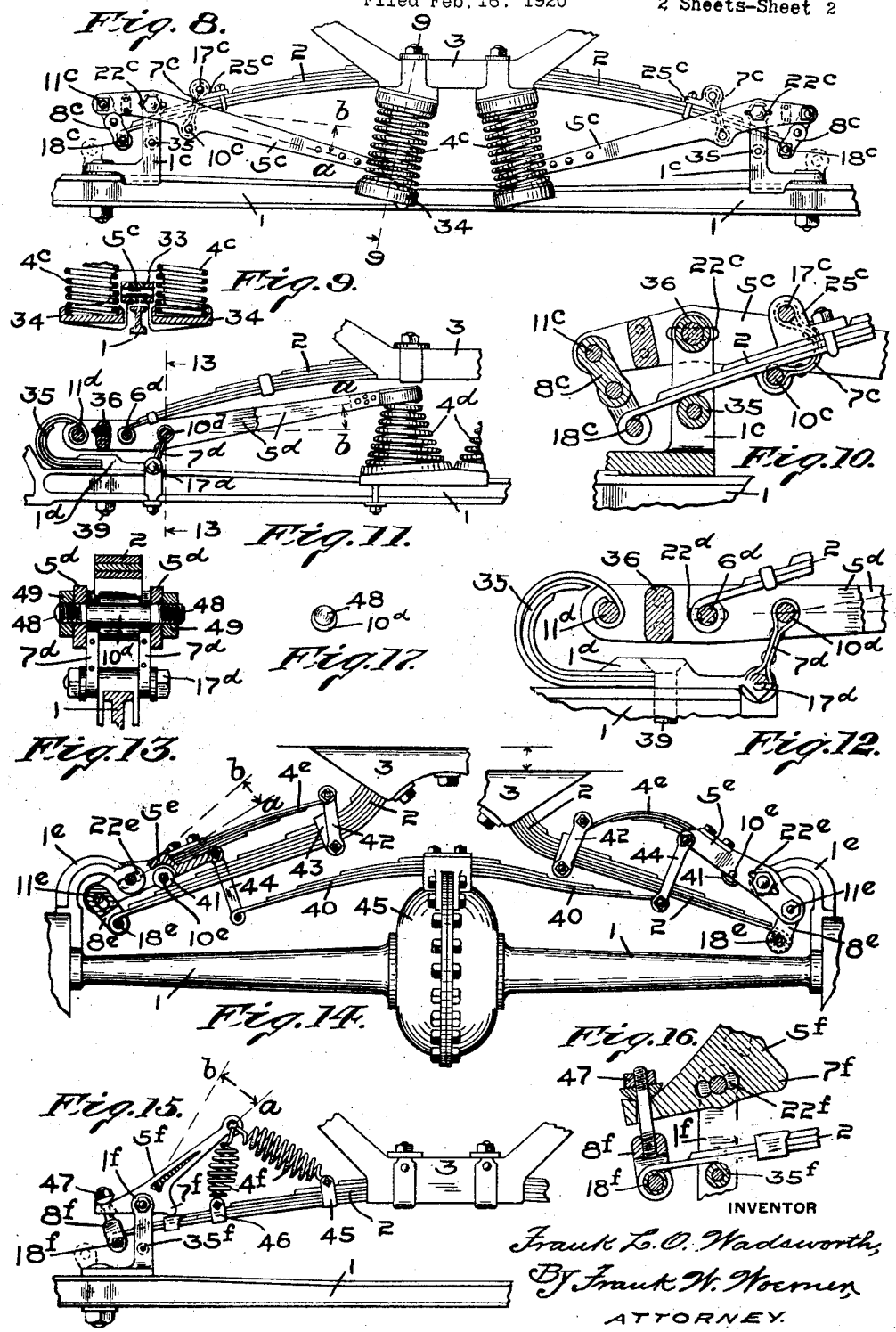

1,622,552

UNITED STATES PATENT OFFICE.

FRANK L. O. WADSWORTH, OF PITTSBURGH, PENNSYLVANIA.

SPRING SUSPENSION FOR VEHICLES.

Application filed February 16, 1920. Serial No. 358,817.

My invention relates to forms of shock absorber construction of the well known lever-actuated supplemental spring suspension type similar to those disclosed in the Hassler Patents Nos. 1,130,897, 1,149,756, and 1,293,425. The primary object of the present improvements is to provide a device of this character which will afford a sensitive elastic resistance to closing or compressive movements of the spring supported vehicle parts, and which will also efficiently and positively restrain and check all recoil or expansion movements of the elastic system;—thereby securing an effective "dead beat" absorption both of the compressive shocks and of the even more objectionable rebound or "tossing" vibrations, and contributing both to the comfort and the safety of the occupants of the vehicle.

Another object of my improvements is to provide a lever-actuated-supplemental-spring organization in which the resilient member of the combination is operatively flexed or strained in the same direction—to the same or to different degrees as may be required—by either the approach or the separation of the relatively movable members of the vehicle; thereby eliminating the deleterious effects of alternating and reversely applied stresses on the said member, and utilizing, in the most effective way, the elastic resistance of the supplemental spring in restraining and damping both the closing and the opening movements of the spring connected parts.

A further object of my improvements is to provide a combination of a primary spring, and a lever actuated secondary spring so coupled thereto as to impose a reactive strain on the primary resilient member that will stiffen the latter, and progressively increase its flectural resistance to excessive kinetic stresses—thereby increasing the capacity of the spring system to carry very heavy loads and to successfully withstand and absorb very severe shocks without permanent distortion or fracture.

Still another object of these improvements is to provide a lever-actuated-supplemental-spring construction that is simple in design and easy to manufacture; and is also capable of being readily attached to various types of main spring suspension organizations—of either the side leaf or the cross leaf species—without any change in the arrangement of the vehicle and the main spring parts; thus enabling the owner, or users, of any standard car to utilize the present invention without incurring any large expense.

Still other objects and advantages of my improvements will be made apparent by the accompanying illustrations and description of various exemplary embodiments of the invention as applied to different standard forms of main spring systems now in common use.

In the drawings—which are to be regarded as largely diagrammatic in character—Fig. 1 illustrates my invention applied to a side leaf (or cross leaf) spring of the full elliptic form, the parts being shown in the position which they occupy in normal load position; Fig. 2 is an enlarged detail view of a portion of the construction showing the parts in the position they assume under an increased compressive stress; Fig. 3 is another view, similar to that of Fig. 2, but showing the relative position of the same parts when the suspension system rebounds or expands beyond the normal load position; Fig. 4 is a side elevation—partly in section—of a modified form of my invention as applied to a semi-elliptic side leaf main spring suspension; Fig. 5 is an enlarged view of a portion of my Fig. 4 construction showing the parts thereof under compression; Fig. 6 illustrates another embodiment of my invention, as it may be utilized in conjunction with a semi-elliptic-scroll-spring combination of either the side leaf or cross leaf type; Fig. 7 is a diagram showing the action of this organization (Fig. 6) under both compression and rebound or expansion movements; Fig. 8 is a side elevation of a cross-leaf-semi-elliptic spring suspension system that exemplifies another application of my improvements; Fig. 9 is a partial sectional view on the plane 9—9 of Fig. 8; Fig. 10 is an enlarged detail view—in longitudinal section—of a portion of the structure shown in Fig. 8 with the parts thereof in the position which they assume under a heavy kinetic stress; Fig. 11 illustrates a modification of the suspension system of Fig. 8; Fig. 12 is an enlarged illustration, similar to that of Fig. 10, but showing the parts of my Fig. 11 construction in the position which they occupy when subjected to rebound or expansion stresses; Fig. 13 is a partial sectional elevation on the plane 13—13 of Fig. 11; Fig. 14 is an elevation of another embodiment of my invention as applied to the rear cross leaf spring suspension of a Ford type of car; Fig. 15 illustrates still another application of my improvements to a very light and flexible cross leaf spring support for light vehicles; Fig. 16 is an enlarged detail view of a portion of the construction shown in Fig. 15; and Fig. 17 is a detail view of the adjustable pivot support that is specifically illustrated in Fig. 13 but which may be used in any of the forms of construction shown in Figs. 1 to 14 inclusive.

In the construction shown in Figs. 1, 2 and 3, the lower element of the full elliptic spring 2 is secured to the axle member 1 of the vehicle and the upper element of this spring is bolted to the body member 3 thereof, in the usual manner; and the ends of the semi-elliptic elements 2—2, are connected to each other—at either one or both extremities—through the instrumentality of my invention. In the organization, now under consideration, this comprises, a volute supplemental spring 4 supported at one of its extremities on the intermediate portion of the upper semielliptic leaf spring 2; a lever 5 pivotally attached, by the cross bolt 6, to the outer extremity of the said spring; and a pair of coupling members 7 and 8, which are engaged at one end by the cross bolts 10 and 11 in the lever element 5, and which are pivotally mounted at their opposite extremities on the bracket 12 that is clipped to the lower semi-elliptic spring by means of the cross bolt 14 and the stirrup bolt 15. The coupling 7 consists of a pair of interdigitate links, 16—16, that are pivotally connected to each other at their adjacent ends and are coupled at their outer extremities to the cross bolt 10 (in the lever 5) and the cross bolt 17, in the bracket 12. The coupling member 8 consists of a single link that is mounted at one end on the pivot bolt 18 in the bracket 12; and is provided at its opposite extremity with a slot 19 that engages with the cross bolt 11. A strap or brace bar 20 is interposed between the stirrup bolt 15 and the axle block 1 for the purpose of reinforcing the action of the bracket 12 in stiffening the lower left hand side of the main spring 2.

The functional action of the above described mechanism is as follows: When the system is subjected to a kinetic compressive stress—which tends to move the body and axle parts, 3 and 1, toward each other—the distance between the pivot bolts 6 and 14 is decreased, and the lever 5 is rocked, in a counterclockwise direction, on the cross bolt 11; thereby compressing the supplemental spring 4 against its seat on the upper portion of the main spring 2. This action continues until the lower edges of the lever arms 5 abut against the adjacent side edges of the bracket 12—as shown in Fig. 2—thereby arresting further angular movement of the lever 5. Further approach of the body and axle parts is then resisted by the continued flexure of the two sides of the elliptic leaf spring 2, and also by the reaction of the supplemental spring 4 against its seat on the upper element of the main spring. During the closing movement of the parts the links 16—16 are inactive, or inoperative, and fold up on one another as shown in Fig. 2. When the parts return to normal load position these links are straightened out; and the relative adjustment of the coupling elements 7 and 8 is such that both of the said elements are under some strain—the one of tension and the other of compression—when the spring system is in static equilibrium. When the body and axle members rebound or expand beyond this position the separation of the spring-eye bolts 6 and 14 rocks the lever element 5, on the link bolt 10 as a fulcrum, and thus again compresses the supplemental spring 4 in the same direction in which it was flexed by the closing, or approach, of the spring suspended parts. This last action continues until the members have reached the position shown in Fig. 3, where the angular movement of the lever 5 is checked by the engagement of the coupling pin 11 with the outer end of the slot 19; and after this occurs further separation of the body and axle members is restricted solely by the reverse flexure of the main spring elements 2.

In order to avoid any clogging of the slot 19 with dust or dirt, the side bars of the lever 5 are made of such width as to completely cover the said slot in all positions of lever movement; and a pair of leather or fibre washers 21 may also be interposed between the sides of the link bar 8 and the adjacent faces of the lever arms 5, as an additional protection against undue wear of the moving parts. It is also desirable to provide grease cups or other suitable means for lubricating the various pivot joints of the lever-spring-suspension organization; but the use of such means is so common and so well understood that I have not deemed it necessary to complicate the drawings by any specific illustrations of such device.

The various operative members of the construction shown in Figs. 1 to 3 are so designed and arranged relatively to each other that the lever element 5 is rocked through the maximum angle $a$—$b$ (see Figs. 1 and 2) in the closing or compression movement of the system; and is similarly rocked through a maximum angle, $a$—$c$ (see Figs. 1 and 3) in the rebound or expansion movement thereof. These two rocking movements compress the supplemental spring 4, to almost the same degree; but the distances between the connection 6 and the two respective fulcrum points 10 and 11 are so proportioned that the angular movement $a$—$c$ is produced by a considerably smaller amount of rebound—or expansion beyond the normal load position (of Fig. 1)—than is necessary to effect the angular movement, a—b, by the kinetic compression of the suspension system. The elastic resistance of the secondary spring to a given rebound movement is therefore proportionally greater than is the similar resistance to the same amount of compressive movement; but it will be understood that the ratio between these resistances can be varied as desired by alterations in the distances 6—10, and 6—11. Such alterations can be readily provided for by adjustably mounting the ends of the pivot bolt 6, in slots (or in an equivalent series of spacer holes) 22 in the side arms of the lever 5, or in any other suitable manner. The slight shifting of the lever element with respect to the ends of the spring elements 2 and 4 will not interfere with the proper action of this resilient suspension system.

In the embodiment of my invention which is illustrated in Figs. 4 and 5 the semielliptic main spring 2 is coupled at its inner end to the vehicle body by the usual fixed pivot bolt support, and is bolted at its center to the axle bracket 1. A lever $5^a$, of similar construction to that shown in Figs. 1 to 3, is pivotally connected, at an intermediate point of its length, with the outer end of the main spring by means of a cross bolt $6^a$, the ends of which are clamped in any desired position in the slots $22^a$ of the lever arms. An extension bracket $12^a$ is bolted to the scroll iron $3^a$ of the body member 3; and is provided with a cross belt $17^a$ and a bearing boss $18^a$ which carries a guide pin bolt 23. The lever is likewise provided with two cross bolts $10^a$ and $11^a$, which are operatively connected to the elements $17^a$ and $18^a$—23, by means of the couplings $7^a$ and $8^a$. In this construction the coupling $7^a$ consists of a flexible strap of leather or thin sheet metal, or other suitable material, which is connected at its ends to the opposing pivot bolts $10^a$ and $17^a$. The coupling member $8^a$ consists of a solid link pivoted at its lower end on the cross bolt $11^a$ and provided at its other extremity with a central convex face, that engages with the bearing boss $18^a$, and also with the two slotted side arms 24, that engage with the ends of the guide pin bolt 23. The inner end of lever $5^a$ engages with the smaller end of a volute supplemental spring $4^a$ that is supported on an intermediate portion of the main spring 2.

The primary functional action of this second illustrative embodiment of my improvements is substantially the same as that of the organization first described. When the parts are subjected to a kinetic compressive stress the outer end of the main spring and the bracket member $12^a$, are forced toward each other; and the lever $5^a$ is rocked downwardly by the action of the compression coupling $8^a$, thereby compressing the supplemental spring $4^a$ against its support on the main spring 2. This action continues until the lower side of the bracket $12^a$ comes in contact with the upper edges of the side arms of the lever $5^a$—as shown in Fig. 5—whereupon the angular movement of the lever is arrested, and further approach of the body and axle members is resisted by the direct downward flexure of the main spring, and also by the reactive pressure of the supplemental spring against the axle connection with the central portion of the main spring.

When the parts return to normal load position (see Fig. 4), and rebound or expand beyond that position, the rocker face of the compression coupling $8^a$ is disengaged from the bearing boss $18^a$; and the lever $5^a$ is again rocked downwardly—about the pivot connection $10^a$ as fulcrum—by the action of the tension coupling $7^a$. This reciprocal actuation of the lever-supplemental-spring-combination continues until the guide pin bolt 23 engages with the upper ends of the slots in the arms 24 of the coupling member $8^a$; after which the bracket $12^a$ and the spring eye bolt $6^a$ are locked against further separation, and the continuation of the opening movement is resisted by the reverse bending or flexure of the main spring. But in this case the pressure of the secondary resilient element $4^a$, on the outer edge of its support against the primary spring 2, also tends to resist the reverse bending of the said primary suspension member, and thereby cooperates with the latter in checking rebound even after the angular movement of the lever and the direct compression of the supplemental spring has been arrested as just described.

It will be observed that the arrangement of the principal parts of the organization shown in Figs. 5–6, presents an inversion, or structural reversal, of that depicted in Figs. 1 to 3. In the last described arrangement—in which the lever $5^a$ is pivotally connected at the intermediate point $6^a$ with a part of the axle assemblage 1—2, (instead of with the body assemblage 3—2 of Fig. 1), and the lever is, consequently, rocked downwardly instead of upwardly—the reaction pressure of the flexed supplemental spring $4^a$ against its axle support tends to keep the wheels pressed against the ground when the body member 3 rebounds above normal load position. This is a feature of considerable advantage in tending to prevent skidding, and consequent loss of steering control, when the vehicle is running over rough roads. In this respect the organization of Figs. 4 and 5 is to be preferred to that shown in Figs. 1 to 3. On the other hand, the first described organization is particularly effective in resisting and stabilizing the body movements of the vehicle when the axle and wheels suddenly drop away from the tonneau members—into deep holes or ruts in the road surface—because under such circumstances the thrust or reaction pressure on the supplemental spring is directed upwardly, and tends to resist any downward movement of the body. The question as to which arrangements is most useful is one that depends upon relative load and road conditions. Both of the suspension systems that have been considered, present the common characteristics of utilizing the direct one way action of a lever-actuated-supplemental spring combination to primarily resist either compression or expansion movements of the system; and of also utilizing the reaction strain or pressure thus produced in the supplemental spring to resist a continued movement of the said system after the lever-supplemental spring members have been locked against further direct kinetic action. And they also present, in common, the additional characteristics of permitting the attainment of any desired ratio between the elastic compression resistances presented by the same supplemental spring to relative closing and opening movements, of the body and axle members; and of supplementing and complementing those resistances to the said relative movements by either the successive or the concurrent flexural actions of a main leaf spring, that is alternately and reciprocally strained or bent in opposite directions.

In the illustrative organization shown in Figs. 6 and 7 the main spring suspension comprises a semielliptic leaf spring 2 (pivotally connected at its inner end to the body 3 and bolted at its center to the axle bracket 1) and a stiff quarter elliptic scroll spring $3^b$, which is bolted in the usual manner to the body member 3, and is connected to the outer end of the main spring 2 through the instrumentality of my present invention. In this embodiment of my improvements the actuating lever member $5^b$ is pivoted at an intermediate point in its length on the cross bolt $6^b$, that passes through the outer eye of the axle supported spring 2 and is clamped at any desired position in the slots $22^b$ on the lever arms $5^b$. The two cross bolt pivots $10^b$ and $11^b$—which serve as the two alternately operative fulcrum supports for the lever element—are connected to different portions of the body scroll spring member $3^b$ by means of the couplings $7^b$ and $8^b$, which, in this case, both consist of a pair of interdigitate link elements pivoted together at their adjacent ends. The outer coupling $7^b$ serves to connect the fulcrum support $10^b$ with a pivot bolt $17^b$ that is supported on the stirrup clip 25; while the inner coupling $8^b$ serves to connect the fulcrum bolt $11^b$ with a pivot support $18^b$ that is carried by a stiffening bracket $12^b$, on the end of the scroll spring $3^b$. The bracket support $12^b$ is also provided with a second pivot connection 26, which carries the outer ends of an H shaped rocking guide or radius arm 27; and the inner extremities of this guide member are pivotally connected with the clamping heads, or nuts, at each end of the cross bolt $6^b$. This "radius arm" connector is provided for the purpose of maintaining the proper alignment of the main spring members 2 and $3^b$, and checking either a side sway, or a longitudinal "pitching" of the adjacent ends of those members with respect to each other.

The inner ends of the lever arms $5^b$ are pivotally connected to a head 28 that is deeply recessed on its under side to receive the upper extremities of a pair of supplemental helical springs $4^b$ $4^b$; and these springs are supported at their lower ends on another recessed head, that is carried, in part by the axle bracket 1, and in part by the adjacent portion of the main spring 2. Another pair of auxiliary tension springs 29 are connected, one on each side, to the body clip 30 of the scroll spring $3^b$, and are attached at their lower extremities to the inner ends of the lever arms $5^b$.

When the organization of Fig. 6 is subjected to a kinetic compression stress, which tends to move the axle and body members, 1 and 3, towards each other, the pivot bolts $6^b$ and $18^b$ are separated, and the pull of the tension coupling $8^b$, brings the various connective elements $5^b$, $7^b$, $8^b$, $10^b$ and $11^b$ into the full line positions shown in the diagram of Fig. 7; thereby rocking the actuating lever $5^b$ downwardly through the arc $a$—$b$ of Fig. 1—about the fulcrum support $11^b$—and simultaneously applying compressive and tension stresses respectively to the supplemental and auxiliary springs $4^b$ and 29. This rocking movement of the lever $5^b$ continues until the accompanying movement of the H shaped guide lever 27 brings the central cross bar thereof into contact with the stop 31 on the bracket $12^b$, and thereby prevents further separation of the pivot bolts $6^b$ and $18^b$; after which a continued closing movement of the axle and body members is resisted by the positive or compressive flexure of the main spring elements 2 and $3^b$ and by the reactive resistance of the supplemental springs $4^b$ against the axle connection 1.

When the parts of the last described suspension system rebound, or separate beyond the normal load position shown in Fig. 6, the pivot bolts $6^b$ and $18^b$ approach each other, and the tension coupling $7^b$ now acts to again rock the lever $5^b$ downwardly—this time about the pivot bolt $10^b$ as a fulcrum—thereby flexing the supplemental and the auxiliary springs $4^b$ and 29 in the same direction as before. This reciprocal actuation of the lever-supplemental-spring combination (by the expansion of the system) brings the parts 5$^b$, 6$^b$, 7$^b$, 8$^b$, 10$^b$ and 11$^b$ into the dotted line positions shown in the diagram of Fig. 7; in which position the cross bar of the H shaped guide has become engaged with the lower stop 32 on the bracket 12$^b$ and the eye connections 6$^b$ and 18$^b$ are thus locked against further movement towards each other. A continuation of the movement of the spring supported parts—beyond that last indicated—will now be resisted by the negative or reverse bending of the main spring elements 2 and 3$^b$ and the upward throw of the body 3 will be further restrained by the reactive pull of the tension springs 29 on the clip connection 30.

The organization shown in Fig. 6 presents, therefore, the same generic features of construction and functional action as are characteristic of the two first described embodiments of my invention. It also presents the specific feature of supplemental spring reaction effect that is exemplified by my Fig. 4 construction. In addition to this it further illustrates the utilization of an auxiliary spring which not only cooperates with the supplemental spring to elastically resist both closing and opening movements of the entire system, but also has a specific reaction effect in checking upward movements of the body beyond the point at which the actuating lever is locked against further kinetic action. It will be observed that the use of this duel set of secondary springs—which are operatively connected to both the axle and the body members—presents a construction in which the pressures on the spring supports (e. g. 1—2 and 3—30) are alternately opposed to the relative direction of their displacements from normal load position—i. e. the pressure on the axle seat of the elastic unit 4$^b$ is directed against the relative approach of the axle and body members, while the pull on the body support 30 for the spring unit 29 is opposed to the relative rebound of the body and axle parts—and the combined action of both springs in thus resisting opposing movements of the elastically connected vehicle members, depends on the proportionate strength, and the initial or normal load flexure, of these secondary suspension elements. These factors of supplemental spring resistance can of course be varied to any extent desired; that is to say the springs 4$^b$ may be made very flexible, and the springs 29 very stiff; or vice versa; or both units may be given substantially the same elastic resistance, in which last case the downward thrust on the axle block assemblage will be balanced, by the downward pull on the body assemblage, in all phases of the operation. From an operative standpoint the lever actuating mechanism illustrated in Fig. 6 is, in some respects, to be preferred, to that shown in Figs. 1 to 5, because it presents no open or sliding joints; but this advantage is counterbalanced to some extent by its having a somewhat increased number of parts.

The organizations illustrated in Figs. 1 to 6 may all be utilized, if desired, as cross leaf spring suspensions; in which case each end of the main resilient element will be preferably connected to the opposing vehicle member by means of one of my improved lever-actuated-supplemental spring combinations. Figs. 8, 9, 10, 11, 12 and 15 show other applications of my improvements to the usual form of cross leaf main spring support for the front axle of a Ford car; and Fig. 14 illustrates another embodiment of my invention as it may be used in conjunction with the main cross leaf spring suspension for the rear driving axle of such a car.

In the construction shown in Figs. 8, 9 and 10 the actuating lever element 5$^c$ is pivotally supported at an intermediate point of its length on the axle perch 1$^c$ and is provided, as before, with two cross bolt connections 10$^c$ and 11$^c$ that are flexibly joined, by the couplings 7$^c$ and 8$^c$, to two separated points on the main spring 2. The coupling element 7$^c$ consists of a flexible strap or band the upper end of which is connected to a cross bolt 17$^c$ that is carried by the main spring body clip 25$^c$; and the coupling element 8$^c$ consists of a pair of interdigitate links (like those previously described as part of the constructions shown in Figs. 1 and 6) the lower extremity of which is pivoted at 18$^c$ to the eye or outer extremity of the main spring. The inner extremities of the side arms of the lever 5$^c$ are brought together and flexibly connected to a boss 33 on the central rib of the double head 34 (see Fig. 9); and the said head is deeply recessed on its upper side to receive the lower ends of a pair of supplemental helical springs 4$^c$ 4$^c$, that are arranged one on each side of the axle member 1, and are supported at their upper ends on the body connections with the main spring 2.

The operation of the suspension system last described is as follows: When the parts are subjected to compressive stress, the main spring and axle members move toward each other, and the resultant pull of the coupling element 8$^c$ on the outer extremity of the lever 5$^c$ rocks the latter upwardy, on its axle perch connection, and thereby compresses the supplemental springs 4$^c$ against the body support 3. This kinetic actuation of the lever-supplemental-spring combination continues until the lever has rocked through the arc $a$—$b$ (see Fig. 8) and the end of the main spring has come into contact with a roller 35 that is mounted between the side arms of the axle perch support 1$^c$ (see Fig. 10); but after this engagement occurs any further compression of the suspension system is resisted and restrained by the direct bending or flexure of the main spring, assisted by the reaction of the locked lever-supplemental-spring elements against the body support 3. When the parts return to normal load position (Fig. 8) both of the couplings 8$^c$ and 7$^c$ are under tension (by reason of the initial tension applied to the supplemental spring 4$^c$); and when there is any rebound or expansion beyond this position the upward movement of the main spring—or the relative downward movement of the axle members 1 and 1$^c$—exerts a pull on the strap connection 7$^c$ which again rocks the lever 5$^c$ upwardly, and thereby compresses the supplemental springs in the same direction as before. When this action has brought the end of the main spring into contact with the cross roller 36, the angular movement of the lever is arrested, and any further separation of the body and axle members is checked by the negative or reverse flexure of the main spring alone.

In the specific arrangement of parts illustrated in Figs. 8 and 10 the ratio between the angular movements of the lever element— (and the consequent compression of the supplemental springs 4$^c$)—that are produced by a given compressive and expansion movement of the spring connected parts, is substantially unitary; but this relation can be readily varied by clamping the ends of the pivot bolt connection with the axle perch 1$^c$, at different points in the slots 22$^c$ of the side arms of the lever 5$^c$. In order to permit this shifting of the lever support without disturbing the alignment of the axes of the supplemental springs 4$^c$ with the inner end of the lever, the latter is preferably coupled with the boss 33 by means of a pin and slot connection, or by means of short shackle links or in any other suitable manner. When volute or conical supplemental springs, or a pair of tandem supplemental springs, are used (as shown in Figs. 1, 4 and 6) a small longitudinal shifting of the point of attachment between the lever and the said springs does not interfere with the proper action of the combination; but where the supplemental springs are of the straight helical form and are arranged as shown in Fig. 8 it is desirable to avoid any application of stress to one side of the common axial plane of the two springs 4$^c$, as that might tend to overturn them on their base supports 34.

In the construction shown in Figs. 11, 12 and 13 the intermediate part of the lever 5$^d$ is pivoted on the cross bolt 6$^d$ that passes through the terminal eye of the main spring 2 (which is rigidly mounted on and forms a part of the body assemblage); and the cross bolts 10$^d$ and 11$^d$ of this lever element are respectively connected to the axle member 1 by means of the flexible straps 7$^d$ 7$^d$ (which are attached to the axle by the bolt 17$^d$ see Fig. 13) and by means of the flexible spring coupling 35. This last mentioned element consists of a spiral scroll spring which is bolted at its lower end to the axle 1 and which is so formed as to yield readily in an upward direction, and also in a direction parallel to the lever and main spring members; but which is relatively rigid against any downward movement of the bolt connection 11$^b$. The inner ends of the side arms of the lever 5$^d$ are riveted or otherwise secured to a head which engages with the upper smaller end of the volute supplemental spring 4$^d$ which is suitably supported on the axle member 1.

When the parts of the last described suspension system are subjected to a kinetic compression stress, the lever 5$^d$ is rocked downwardly—about the pivot bolt connection 11$^d$ as a fulcrum—by the relative approach of the axle and the main spring connection 6$^d$; and the volute supplemental spring is correspondingly compressed against its lower seat on the axle 1. This movement may continue until the lower edge of the spacer block 36 (between the lever arms 5$^d$) engages with the upper face of the axle clip 1$^d$; after which the further continued approach of the body and axle members is resisted by the direct, or compressive flexure of the main spring 2, and by the reactive static pressure of the supplemental spring 4$^d$ against its axle support. When the parts return to normal load position (Fig. 11), and then rebound or expand above or beyond that position, the flexible straps, 7$^d$ are put under tension, and the separation of the axle and main spring connections 1$^d$ and 6$^d$, again rocks the lever 5$^d$ downwardly about the pivot bolt 10$^b$ as a fulcrum; the lever connection 11$^d$ being permitted to rise freely by the uncoiling of the outer leaf of the scroll spring coupling 35—as shown in Fig. 12. In this case there is no check imposed on this second angular movement of the lever except that produced by the gradually increasing resistance of the spring coupling 35 to the upward rise of the pivot bolt 11$^d$. But as this resilient coupling restraint increases the rocking movement of the lever on the fulcrum support 10$^d$—and the corresponding compression of the supplemental spring 4$^d$—is gradually checked; and the ultimate damping of excessive rebound or expansion movements is effected by the reverse bodily flexure of the main spring 2, assisted by a corresponding upward and inward flexture of the scroll spring 35. The relation between the relative movements of the main spring, in the compression and expansion actions of the system, and the corresponding angular and flectural movements of the lever and supplemental spring elements may be varied, as before explained, by shifting the position of the pivot bolt $6^d$ in the slots $22^d$ of the lever arms $5^d$. If the change in position is considerable it may necessitate shifting the spring coupling 35 in its axle clip support $1^d$; and this is easily effected by loosening the clamp bolt 39 which holds the outer end of the said clip in place.

The suspension system shown in Fig. 14 presents a lever-actuated-dual-spring-combination, analogous to that shown in Fig. 6 supra, in which both of the supplemental resilient elements $4^e$ and 40 are of the same character as the main spring 2; i. e. they are all multiple leaf springs. The left hand side of this figure illustrates the parts in the normal load position (of static equilibrium); and the right hand portion illustrates the action of the parts under a kinetic compression stress. In this organization of the actuating lever element $5^e$ consists of a relatively short forging, or casting, which is forked at its outer extremity to receive the ends of the axle perch support $1^e$ and of the slotted tension link $8^e$; and which is also provided with a pivot pin $10^e$ that carries a contact roll 41. The tension link $8^e$ is coupled at its lower end to the extremity of the main spring 2 by means of the cross bolt $18^e$; and the parts are so adjusted that in normal load position the roll 41 is in light pressure engagement with the upper side of the said main spring. The base of the multiple leaf supplemental spring $4^e$ is bolted to the inner end of the lever $5^e$, and the flexible end of this secondary resilient element is coupled to the central portion of the main spring body assemblage by means of a pair of shackle links 42 and a clip 43. The inner end of the lever $5^e$ is also coupled to the extremity of another supplemental leaf spring 40, by means of another pair of shackle links 44; and the base of this second auxiliary spring is supported on the top of the differential gear case 45 of the rear axle assemblage.

When the body and axle portions of the organization shown at the left hand of Fig. 14, are forced toward each other—as shown at the right hand of that illustration—the lever element $5^e$ is rocked upwardly, about its pivot support on the axle perch $1^e$, by the downward pull of the main spring on the tension link $8^e$ and the pivot pin bolt $11^e$. This upward movement of the lever $5^e$ imposes a positive, or compressive, bending strain on both of the supplemental leaf springs $4^e$ and 40; and this action continues until the end of the resilient member 40 comes into contact with the lower side of the main spring 2 (as shown at the right of Fig. 14). When this engagement occurs the connected lever-spring-elements are locked against further relative angular motion with respect to each other; and a continuation of the closing or approach movement, of the body and axle members, is resisted and restrained by the positive or compressive flexure of the main spring 2 aided by the reactive pressures of the flexed supplemental springs $4^e$ and 40, against the lower side of the said main spring. This lever-controlled triple spring combination therefore affords, not only a very sensitive and highly resilient support—for completely absorbing light compressive shocks—but also a very stiff reinforced suspension for resisting excessive load stresses and restraining and damping abnormal closing movements of the body and axle parts.

When the system of Fig. 14 is subjected to rebound of expansion stresses—which tend to induce a separation, or expansion, of the spring supported members beyond the position of static equilibrium—the extremity of the main leaf spring 2 and the end of the axle perch support $1^e$ are moved toward each other; and the pressure engagement between the main spring and the roll 41 rocks the lever $5^e$ upwardly (or in the same direction in which it is moved under compressive stress on the parts), and again imposes a positive or compressive flexure on the supplemental leaf spring elements $4^e$ and 40. This angular motion of the lever-supplemental-spring-elements is checked when the upper side of the main spring 2 comes into engagement with the rigid end of the axle perch support $1^e$; and after this occurs further expansion movement of the system is restrained and damped by the reverse or negative flexure of the primary spring alone. In the particular positioning of the parts shown in Fig. 14 the distance of the roll support $10^e$ from the axle perch pivot, is less than the distance of the coupling bolt $11^e$ from that pivot; and the angular movement communicated to the lever by the expansion of the system is correspondingly greater than the movement imparted to that member by the same degree or amount of compression or closing of the body and axle parts. The relation between the comparative actions of the secondary and the primary spring elements, in respectively resisting and absorbing compressive and rebound movements, may be varied by clamping the ends of the axle perch pivot pin at different points in the lever slots $22^e$; or by providing the pin $10^e$ with similar means for longitudinal adjustment of the lever.

The organization shown in Figs. 15 and 16 is, in some respects, very similar to that shown in Fig. 14. In this illustrative embodiment of my improvements the solid lever member $5^f$ is pivotally supported between the side forks of the stirrup shaped axle perch $1^f$; and is operatively engaged with the main spring 2 by means of the eye bolt $8^f$ and the bearing lug 7ᶠ. The inner end of the lever 5ᶠ is also connected with the main spring by the supplemental tension springs 4ᶠ that are attached at their lower ends to the clips 45 and 46.

When the body and axle parts of this construction are forced toward each other, and lever 5ᶠ is rocked upwardly (along the arc a—b), by the pull of the eye bolt coupling 8ᶠ on the outer extremity of the lever element; and the supplemental springs 4ᶠ are thereby subjected to a progressively increasing tension, which reacts on the under side of the main spring 2 and thus stiffens the latter against compressive flexure. When the outer extremity of the primary suspension element comes in contact with the stop roll 35ᶠ—as shown in Fig. 16—the rocking movement of the lever 5ᶠ is arrested, and further approach of the axle and body members 1 and 3 is resisted and ultimately checked by the positive or compressive flexure of the main spring 2, assisted by the reactive tension of the supplemental springs 4ᶠ. On reverse movements of the system (above the position of static equilibrium shown in Fig. 15) the lever 5ᶠ is rocked upwardly by the pressure engagement of the bearing lug 7ᶠ against the upper side of the main spring 2; and the secondary resilient elements 4ᶠ are again flexed in the same direction as before. This action continues until the end of the main spring comes into contact with the under side of the lever 5ᶠ; and after this occurs the further expansion of the spring connected parts is restrained and damped by the negative or reverse flexure of the primary resilient member 2.

In the last described organization the relation between the tension strains imposed on the supplemental springs 4ᶠ, by closing and opening movements of the system, is varied by providing the lever 5ᶠ with a series of closely adjacent holes 22ᶠ (see Fig. 16); any one of which may be engaged, as desired, by the pivot bolt at the upper end of the forked axle perch 1ᶠ. The longitudinal shifting of the lever on its axle perch support—by the engagement of the axle perch pivot bolt in different holes in the lever—does not disturb the operative engagement of the coupling elements, 7ᶠ and 8ᶠ, and of the supplemental spring elements 4ᶠ, with the main spring member 2; but does alter the degree of angular movement imparted to the member 5ᶠ by a given linear movement of the main spring (and body) either toward or away from the running gear parts.

In the utilization of my improvements it is generally desirable to provide means for taking up wear in the coupling connections 7 (to 7ᶠ) and 8 (to 8ᶠ); and also for varying the initial tension of the supplemental spring elements 4 (to 4ᶠ). In the last described embodiment of my invention this adjustment is conveniently effected by the use of a nut 47, on the upper end of the eye bolt link 8ᶠ, to alter the effective operating length of that coupling, and thereby simultaneously vary the pressure engagement, and the angular relationship, between the lever parts and the main spring connections therewith. In the other illustrative exemplifications of my improvements these same adjustments may be provided for by making any one, or more, of the pivot bolt connections, between the actuating lever and the other cooperating elements of the combination, of the form shown in Figs. 13 and 17; where the pivot bolt 10ᵈ (for example) is formed with eccentric end portions 48. By rotating this pin on its eccentric end bearings, and clamping it in the desired position, by means of the nuts 49, 49, any wear or looseness in the coupling connections may be readily taken up; and the initial strain or flexure in the supplemental spring elements—in the position of static equilibrium—may likewise be adjusted, or altered, to meet varying load and running conditions.

It will be observed that all of the organizations hereinbefore described, as illustrative of varying applications of my invention to different forms and types of main spring suspension systems, are characterized by the same generic features of functional action; and that such variations in operation as have been heretofore noted relate only to the specific character of the reaction stresses and strains that may be imposed on the cooperating main and supplemental spring elements by the attachment of the latter to different portions of the structural combination. From a functional standpoint the distinguishing feature of my improvements may be generally designated as a dual-action-double-fulcrum lever control of a multiple spring suspension system; in which one of the resilient elements is always positively flexed in the same direction whenever the body and axle members move in either direction (relative to each other) from the position of static equilibrium; in which this "one way" progressive flexure of the said element is arrested when the linear approach or separation of the chassis members has exceeded certain predetermined limits; and in which further motion of the said members beyond the said limits, is resisted by reciprocal or reversed flexures of another spring and also by the reactive stress of the previously flexed element of the organization. From a structural standpoint each of the combinations hereinbefore illustrated and described comprise a lever element operatively connected at one end to a supplemental spring resistance and provided at its other extremity with three adjacent points of pivotal, or flexible, engagement with two relatively movable members; the said engagements being of such character as to alternately shift the point of fulcrum support for the lever to opposite sides of the point of application of the power—thereby converting the lever element from one of the first order to one of the third order, or vice versa—when the direction of the applied stress is reversed. This result is secured, structurally, by connecting the lever element, at an intermediate point in its length, to one of the relatively movable parts of the vehicle chassis—i. e. to either the body assemblage (as in Figs. 1, and 11) or to the axle assemblage (as in Figs. 4, 6, 8, 14 and 15)—and flexibly coupling two other points of the said lever (on opposite sides of the first mentioned point of connection) to the other relatively movable portion of the chassis;—viz, to the axle assemblages of Figs. 1 and 11 and to the body assemblage of Figs. 4, 6, 8, 14 and 15. Each of these combinations is further characterized by the use of two single acting or "one way" coupling elements which are normally in operative engagement with both points of their connection with the convertible lever member, but which are operatively engaged and disengaged, in reverse order, as the spring suspension system is reversely stressed and the parts thereof are correspondingly displaced from the position of normal static equilibrium.

All of the hereinbefore described embodiments of my improvements are provided with means whereby the relative lengths of the two arms of the convertible lever member may be readily varied, to alter the ratio between the movements of the supplemental spring resistances and the moments of the reversely applied lever actuating forces; and all of the said exemplary embodiments also illustrate means for adjusting the initial engagement pressures or strains on the lever and the supplemental spring elements; whereby all looseness, or wear, between the operating parts may be taken up, and whereby the sensitiveness of response of the lever-supplemental-spring combination, to light shocks and small oscillatory movements, may also be altered to meet varying load and road conditions. These last described characteristics of my invention are useful but not indispensible features of my present improvements.

The variation in the relative positioning of the supplemental spring and lever members, with respect to the body and axle parts of the vehicle (as illustrated in the various combinations hereinbefore described) result in certain detail differences in the cooperative action of the main and supplemental spring suspension elements, and in the degree of reactive or secondary restraint imposed on either the closing or the expansion movements of the spring connected parts. These variations in the structural arrangement, and in the specific functional performance, of the generic elements of my invention present certain features of secondary importance, which may or may not be utilized in conjunction with the primary improvements herein described and claimed. But with the foregoing disclosure as a guide those skilled in the art will be enabled to make such variations in structural design as may be required to best utilize my improvements in specific cases. I do not therefore desire to limit myself to the use of any particular form of structure, or any specific details of mechanical organization; and what I claim is:

1. An elastic shock absorber organization for two relatively movable members which comprises a lever-actuated spring and a double fulcrum mounting for the lever arranged in such a manner that the lever and the spring are both actuated in the same direction by either compressive or rebound shocks.

2. In a shock absorber suspension for two relatively movable members the combination of a spring; a lever operatively engaged with the said spring; and a double fulcrum connection between said lever and the relatively movable members.

3. In a spring suspension system for vehicles the combination of a spring; a lever operatively engaged with one end of the said spring; and a double fulcrum mounting for the said lever arranged in such a manner that the latter is moved in the same direction whenever the vehicle parts move in either direction from the position of static equilibrium.

4. A spring suspension system for vehicles which comprises a spring; an actuating lever operatively engaged with one extremity of the said spring; and a dual-action-double-fulcrum system of connections interposed between the said lever and the relatively movable parts of the vehicle, arranged in such a manner that the lever and the spring are concurrently actuated in the same direction when the system is either compressed or expanded from and beyond normal load position.

5. In a shock absorber organiaztion for two relatively movable members the combination of a lever; a supplemental spring operatively engaged with one end of the said lever; and a double fulcrum connection interposed between the other end of the lever and the relatively movable members, arranged in such a manner that the lever is rocked, and the spring is flexed, in the same direction whenever the said members are relatively displaced in either direction from their position of static equilibrium.

6. In a shock absorber organization for two relatively movable members the combination of a spring engaged at one extremity with one of the said members; and a lever engaging with the other extremity of the said spring and provided with three points of pivotal connections, one of which is carried by one of the relatively movable members, and the other two of which are coupled to the other of the said members.

7. In a spring suspension system for two relatively movable members, the combination of a spring engaged at one end with one of the said members; a lever operatively connected with the said spring; a lever support carried by one of the relatively movable members and attached to the lever at a point intermediate its ends; and a pair of single acting or one way couplings that connect the other of the said relatively movable members with the lever and serve to alternately actuate the latter by successive compression and expansion movements of the system.

8. An elastic shock absorber organization for a vehicle chassis which comprises a spring supported at one extremity by one of the relatively movable chassis parts; a lever operatively engaged with the opposite extremity of the said spring; a pivot support engaging with the lever at a point intermediate its ends; and a pair of single acting, or one way, coupling elements engaging with the lever on opposite sides of the said pivot support, and adapted to alternately actuate the lever and the supplemental spring by compression and rebound movements of the chassis parts from their normal load position.

9. A spring suspension system for two relatively movable parts which comprises a spring supported by one of the said parts; a lever operatively engaged with the said spring; and a dual-acting-double fulcrum control mechanism for operatively connecting the said lever with both of the said movable parts and for actuating it in the same direction, whenever the said parts are relatively displaced in either direction from the position of static equilibrium.

10. In a shock absorber organization for vehicles the combination of a spring attached at one extremity to one of the vehicle members; a lever operatively engaged with the other extremity of the said spring; a double fulcrum support for the said lever; and means for alternately applying reversed stresses to the lever on opposite sides of its fulcrum support and thereby rocking the lever and flexing the spring in the same direction by either compressive or expansion shocks.

11. In a spring suspension system for two relatively movable members, the combination of a spring resistance; a rocking member operatively engaged therewith; and a pair of single acting coupling elements for successively engaging the rocking member on opposite sides of its fulcrum support and thereby converting the said member from a lever of the first class to a lever of the third class when the relatively movable members are stressed in opposite directions.

12. In a shock absorber organization for two relatively movable parts, the combination of a spring supported by one of the said parts, a rocking member engaged at one of its extremities with the said spring; and a trio of operative connections arranged in such a manner between the said member and the said movable parts as to alternately convert the character of the rocking member from one class to another when the said parts move relatively in opposite directions.

13. A spring suspension system for vehicles which comprises an elastic resistance element; a lever connected at one end with the said element and provided at the other end with a set of three pivotal connections; and means for operatively engaging alternate pairs of these connections with the relatively movable members of the vehicle when the latter are relatively displaced in opposite directions from the normal load position.

14. In a spring suspension system for two relatively movable members the combination of an elastic resistance element; an actuating lever element engaged therewith; a pair of one way coupling elements for operatively connecting the lever to the said movable members; and means for adjusting the relative lengths of the resistance arm and the power arm of the said lever and thereby varying the moment of the elastic resistance to any distortion or displacement of the spring supported parts.

15. A shock absorber organization which comprises the combination of two relatively movable members; a double-action-lever-controlled-spring resistance; means for operatively connecting the actuating lever thereof to the relatively movable members; and means for varying the ratio between the resistance arms and the power arms of the said lever and thereby varying the moment of the spring resistance to both approach and separation movements of the said members.

16. A shock absorber organization for vehicles which comprises a spring; a rocking member for actuating said spring; means for operatively connecting said member with the relatively movable vehicle parts and alternately converting it from a lever of the first class to a lever of the third class; and means for varying the respective lengths of the resistance arms and the power arms of said lever.

17. An elastic suspension system for two relatively movable members which comprises the combination of a double acting spring for damping the movements of the said members in either direction from the position of static equilibrium; with means for simultaneously varying the effective elastic resistance to both of the said movements without altering the initial tension of the said spring.

18. An elastic suspension organization for two relatively movable vehicle members which comprises a double-acting-lever-actuated spring system for resisting both the approach and the separation of the said members; with means for altering the effective resistances of the said system to both directions of movement; and other means for independently altering the initial tension on the said system when the parts are in the position of static equilibrium.

19. An elastic suspension system for two relatively movable members which comprises a spring; an actuating lever therefor; a pair of single acting or one way coupling connections for operatively engaging the lever at different points; and means for adjusting the effective length of said couplings to take up wear therein.

20. An elastic suspension system for vehicles which comprises a spring; a lever operatively engaged therewith; a trio of pivotal connections between the lever and the relatively movable vehicle parts; and means for altering the distances between the centers of engagement of these pivotal connections and thereby varying the spring resistance to a movement of the vehicle parts in either direction from normal load position.

21. In a spring suspension system for vehicles the combination of a double acting elastic resistance; a rocking member operatively engaged therewith; a pair of one way coupling elements for alternately actuating the said rocking member when the system is respectively subjected to compression and expansion stresses; and means for varying the relation between the angular movements of the said rocking member and the linear movements of the vehicle parts in either direction from normal load position.

22. In a shock absorber organization the combination of a plurality of elastic resistance elements; a rocking member for operatively engaging and cooperatively connecting said elements; and a pair of single acting couplings for connecting said member to one of the parts subjected to shock and for alternately actuating it as a lever of the first class and as a lever of the third class.

23. In a shock absorber organization the combination of a plurality of suspension springs; a dual-action-double-fulcrum lever for conjointly and cooperatively actuating said springs to absorb both compressive and rebound shocks; and means for altering the flexural resistance of the composite spring system to both the closing and the opening movements of the suspended parts.

24. A spring suspension system for vehicles which comprises a main spring; a supplemental spring coacting therewith to resist both the minor and the major movements of the suspended parts; a rocking member operatively engaged with both springs; and a pair of single acting coupling connections for alternately actuating said rocking member, as a lever of the first class and a lever of the third class, when the spring suspended parts move in reverse directions from the position of static equilibrium.

25. A spring suspension system for two relatively movable members which comprises a main leaf spring; a supplemental spring supported at one end on one of the said members; a lever operatively engaged with the other end of the said supplemental spring; a trio of pivotal connections between the lever the end of the main spring and that part of the vehicle to which said main spring end is ordinarily attached; and means for successively utilizing alternate pairs of the said connections for actuating the lever, and flexing the supplemental spring in the same direction, by the motion of the said relatively movable members in reverse directions from normal load position.

26. In an elastic suspension system for vehicles the combination of a main spring; a supplemental spring cooperating therewith to resist minor movements of the spring suspended parts in either direction from the normal load position; and means for arresting the flexure of the supplemental spring when the said parts have moved to a predetermined distance on either side of the normal load position.

27. An elastic suspension system for two relatively movable members which comprises a main spring; a supplemental spring; a lever for cooperatively engaging both springs; means for rocking the lever, and flexing the supplemental spring, in the same direction when the said members move in either direction from the position of static equilibrium; and means for arresting the angular movement of the lever, and the attendant flexing of the supplemental spring, when the system has been either compressed or expanded to a predetermined extent.

28. An elastic suspension system for vehicles which comprises a main spring, a supplemental spring supported at one extremity on an intermediate part of the main spring, a lever operatively engaged with the opposite extremity of the supplemental spring; means for actuating the lever, and flexing the supplemental spring, in the same direction by either a compressive or an expansion movement of the system; means for altering the effective resistance of the said supplemental spring to the said movements; and means for arresting the actuation of the lever and the resultant flexing of the secondary resilient element when the spring suspended parts have been either closed or opened to a predetermined amount.

29. In an elastic suspension system for two relatively movable members the combination of a main spring, a supplemental spring supported at one of its extremities by one of the said members; a lever cooperatively engaged with both springs; and means for actuating said lever by the relative movement of the two aforesaid members to incrementally flex the supplemental spring in a direction opposite to that in which the support therefor is moved when the said members approach each other and to similarly flex the said spring in the same direction as the said support moves when the said members are separated beyond the normal position of static equilibrium.

30. A spring suspension system for vehicles which comprises a main spring; a supplemental spring engaged at one extremity with the main spring; and means for moving and incrementally flexing the supplemental spring in a direction opposite to that in which the main spring is cooperatively moved when the system is compressed, and for similarly flexing the said spring in the same direction as that in which the main spring moves when the system is expanded beyond normal load position.

31. A spring suspension system for vehicles which comprises the combination of a main spring; a secondary spring; a rocking member for cooperatively engaging both of the said springs; a pair of single acting coupling elements for connecting the said member to one of the relatively movable vehicle parts and alternately actuating it as a lever of the first and a lever of the third class; and means for excluding dirt from the wearing surfaces of the said coupling connections.

32. A spring suspension system for vehicles which comprises a main spring interposed between the body and axle members, a supplemental spring operatively supported on the body member, a second supplemental spring supported on the axle member, a lever element concurrently engaging both of the said supplemental springs, and means conjoining said lever and said main spring and acting to flex one of the supplemental springs in a direction opposed to the coincident relative movement of its supporting member when the suspension system is compressed, and to likewise flex the other of said springs in a direction opposed to the corresponding relative movement of its support when the system rebounds or expands beyond normal load position.

33. An elastic suspension system for the relatively movable chassis members of a vehicle which comprises a main spring; a supplemental spring supported on one of the said members; a second supplemental spring suported on the other member; a rocking lever cooperatively engaged with both of the said springs; and means for actuating said lever in the same direction by the relative movement of the said members in either direction, and thereby imposing pressures on the secondary spring supports which are alternately opposed in direction to the said movements.

34. A shock absorber organization for two relatively movable members which comprises a main spring rigidly attached to one member, a lever pivotally mounted on the other member and flexibly coupled to the extremity of the said main spring at a point adjacent to its pivotal mounting, a lost motion connection between another part of the lever and a part of the said main spring intermediate its ends, and a plurality of supplemental springs interposed between one end of the said lever and the said relatively movable members.

35. An elastic suspension system for two relatively movable members which comprises a spring, a lever pivotally mounted at an intermediate point of its length on one of the said members and operatively engaged with the said spring, and a pair of flexible couplings conjoining the other of said members with two points on the lever on opposite sides of the said pivotal mounting.

36. In a shock absorber organization for vehicles the combination of a spring, a lever pivotally mounted at an intermediate point in its length on a part of the axle assemblage and operatively engaged with the said spring, and a pair of alternately active couplings conjoining two other points in the lever with parts of the body assemblage, substantially as described.

37. An elastic suspension system for two relatively movable members which comprises a main spring rigidly mounted on one of said members, a lever pivotally supported on the other of said members, a flexible coupling conjoining one part of the said lever and the end of the said main spring, a one way connection between another part of the said lever and an intermediate portion of the said spring, and a supplemental spring interposed between one end of the lever and another intermediate portion of the main spring.

In witness whereof, I have hereunto set my hand at Indianapolis, Indiana, this 28th day of January, A. D., one thousand nine hundred and twenty.

FRANK L. O. WADSWORTH.